(12) United States Patent
Wang et al.

(10) Patent No.: US 11,500,819 B2
(45) Date of Patent: *Nov. 15, 2022

(54) SUPPORTING DEDUPLICATION IN FILE STORAGE USING FILE CHUNK HASHES

(71) Applicant: VMware, Inc., Palo Alto, CA (US)

(72) Inventors: Wenguang Wang, Palo Alto, CA (US); Vamsi Gunturu, Palo Alto, CA (US); Junlong Gao, Palo Alto, CA (US); Maxime Austruy, Lausanne (CH); Petr Vandrovec, Palo Alto, CA (US); Ilya Languev, Palo Alto, CA (US); Ilia Sokolinski, Boston, MA (US); Satish Pudi, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/028,405

(22) Filed: Sep. 22, 2020

(65) Prior Publication Data
US 2022/0092033 A1 Mar. 24, 2022

(51) Int. Cl.
G06F 7/00 (2006.01)
G06F 16/174 (2019.01)
G06F 16/14 (2019.01)
G06F 16/13 (2019.01)

(52) U.S. Cl.
CPC ........ *G06F 16/1752* (2019.01); *G06F 16/137* (2019.01); *G06F 16/152* (2019.01)

(58) Field of Classification Search
CPC .... G06F 16/137; G06F 16/152; G06F 16/174; G06F 16/1748; G06F 16/24556
See application file for complete search history.

(56) References Cited

U.S. PATENT DOCUMENTS

| 8,285,681 | B2 | 10/2012 | Prahlad et al. |
| 8,321,648 | B2 | 11/2012 | Condict |
| 8,621,240 | B1 * | 12/2013 | Auchmoody ....... G06F 21/6272 713/193 |
| 8,930,648 | B1 | 1/2015 | Storer et al. |
| 9,442,806 | B1 | 9/2016 | Bardale |
| 9,471,807 | B1 * | 10/2016 | Chakraborty ....... G06F 21/6227 |
| 9,690,501 | B1 * | 6/2017 | Chopra ................... G06F 3/065 |
| 9,753,955 | B2 | 9/2017 | Agrawal et al. |
| 10,091,297 | B1 * | 10/2018 | Zhao ................... H04L 67/1097 |
| 10,176,189 | B2 | 1/2019 | Berrington et al. |
| 10,191,914 | B2 | 1/2019 | Manville et al. |
| 10,713,380 | B1 * | 7/2020 | Langseth .............. G06F 16/256 |
| 10,776,321 | B1 * | 9/2020 | Balcha ................ G06F 16/1752 |

(Continued)

*Primary Examiner* — Mohammed R Uddin

(57) ABSTRACT

The present disclosure is related to methods, systems, and machine-readable media for supporting deduplication in file storage using file chunk hashes. A hash of a chunk of a log segment can be received from a software defined data center. A chunk identifier can be associated with the hash in a hash map that stores associations between sequentially-allocated chunk identifiers and hashes. The chunk identifier can be associated with a logical address corresponding to the chunk of the log segment in a logical map that stores associations between the sequentially-allocated chunk identifiers and logical addresses. A search of the hash map can be performed to determine if the chunk is a duplicate, and the chunk can be deduplicated responsive to a determination that the chunk is a duplicate.

20 Claims, 5 Drawing Sheets

(56) References Cited

U.S. PATENT DOCUMENTS

| | | | |
|---|---|---|---|
| 11,221,944 B1* | 1/2022 | Wang | G06F 12/109 |
| 2010/0094817 A1* | 4/2010 | Ben-Shaul | G06F 16/174 |
| | | | 707/697 |
| 2013/0212269 A1* | 8/2013 | Kuosa | G06F 21/6218 |
| | | | 709/225 |
| 2013/0318051 A1* | 11/2013 | Kumar | G06F 16/1748 |
| | | | 707/692 |
| 2015/0234855 A1 | 8/2015 | Yakushev et al. | |
| 2016/0330075 A1* | 11/2016 | Tiwari | H04L 29/08072 |
| 2018/0196609 A1* | 7/2018 | Niesen | G06F 16/1752 |
| 2018/0203915 A1* | 7/2018 | Marshall | G06F 16/355 |
| 2020/0019623 A1* | 1/2020 | Wong | G06F 16/9027 |
| 2020/0213156 A1* | 7/2020 | Cheng | H04L 49/354 |
| 2021/0004355 A1* | 1/2021 | Iwase | G06F 16/152 |
| 2021/0026598 A1* | 1/2021 | Zinsmeyer | H04L 9/0894 |
| 2021/0034674 A1* | 2/2021 | Palsetia | G06F 16/9017 |

* cited by examiner

SUPPORTING DEDUPLICATION IN FILE STORAGE USING FILE CHUNK HASHES

BACKGROUND

A data center is a facility that houses servers, data storage devices, and/or other associated components such as backup power supplies, redundant data communications connections, environmental controls such as air conditioning and/or fire suppression, and/or various security systems. A data center may be maintained by an information technology (IT) service provider. An enterprise may purchase data storage and/or data processing services from the provider in order to run applications that handle the enterprises' core business and operational data. The applications may be proprietary and used exclusively by the enterprise or made available through a network for anyone to access and use.

Virtual computing instances (VCIs) have been introduced to lower data center capital investment in facilities and operational expenses and reduce energy consumption. A VCI is a software implementation of a computer that executes application software analogously to a physical computer. VCIs have the advantage of not being bound to physical resources, which allows VCIs to be moved around and scaled to meet changing demands of an enterprise without affecting the use of the enterprise's applications. In a software defined data center (SDDC), storage resources may be allocated to VCIs in various ways, such as through network attached storage (NAS), a storage area network (SAN) such as fiber channel and/or Internet small computer system interface (iSCSI), a virtual SAN, and/or raw device mappings, among others.

In an environment with one or more SDDCs, disaster recovery services may be provided. For instance, data stored on an SDDC may be copied to a remote server (e.g., a cloud server). When a disaster occurs, a secondary SDDC can be activated using the data. Deduplication of the data can allow space savings as duplicated data may be present in an SDDC or across multiple SDDCs.

DETAILED DESCRIPTION

Figure 1:
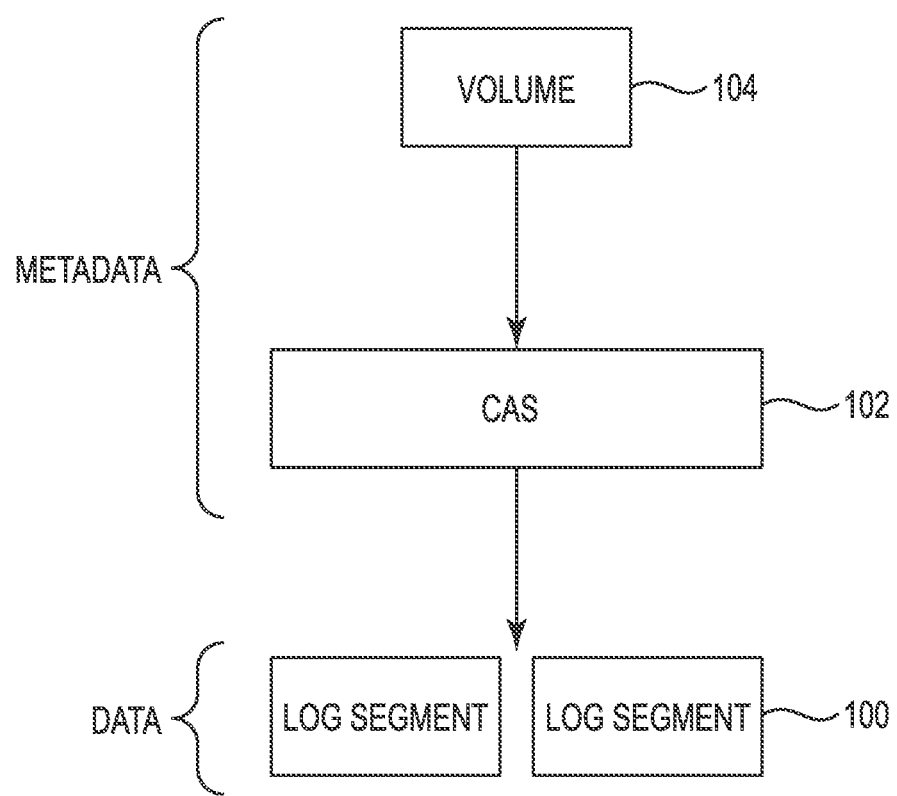
FIG. 1 illustrates data structures for supporting deduplication in file storage using file chunk hashes according to one or more embodiments of the present disclosure.

The term "virtual computing instance" (VCI) refers generally to an isolated user space instance, which can be executed within a virtualized environment. Other technologies aside from hardware virtualization can provide isolated user space instances, also referred to as data compute nodes. Data compute nodes may include non-virtualized physical hosts, VCIs, containers that run on top of a host operating system without a hypervisor or separate operating system, and/or hypervisor kernel network interface modules, among others. Hypervisor kernel network interface modules are non-VCI data compute nodes that include a network stack with a hypervisor kernel network interface and receive/transmit threads.

VCIs, in some embodiments, operate with their own guest operating systems on a host using resources of the host virtualized by virtualization software (e.g., a hypervisor, virtual machine monitor, etc.). The tenant (i.e., the owner of the VCI) can choose which applications to operate on top of the guest operating system. Some containers, on the other hand, are constructs that run on top of a host operating system without the need for a hypervisor or separate guest operating system. The host operating system can use name spaces to isolate the containers from each other and therefore can provide operating-system level segregation of the different groups of applications that operate within different containers. This segregation is akin to the VCI segregation that may be offered in hypervisor-virtualized environments that virtualize system hardware, and thus can be viewed as a form of virtualization that isolates different groups of applications that operate in different containers. Such containers may be more lightweight than VCIs.

While the specification refers generally to VCIs, the examples given could be any type of data compute node, including physical hosts, VCIs, non-VCI containers, and hypervisor kernel network interface modules. Embodiments of the present disclosure can include combinations of different types of data compute nodes.

As used herein with respect to VCIs, a "disk" is a representation of memory resources (e.g., memory resources 556 illustrated in FIG. 5) that are used by a VCI. As used herein, "memory resource" includes primary storage (e.g., cache memory, registers, and/or main memory such as random access memory (RAM)) and secondary or other storage (e.g., mass storage such as hard drives, solid state drives, removable media, etc., which may include non-volatile memory). The term "disk" does not imply a single physical memory device. Rather, "disk" implies a portion of memory resources that are being used by a VCI, regardless of how many physical devices provide the memory resources.

A VCI snapshot (referred to herein simply as "snapshot") can preserve the state of a VCI at a specific point in time. The snapshot can include memory as well. In some embodiments, a snapshot includes secondary storage, while primary storage is optionally included with the snapshot. A snapshot can store changes from a parent snapshot (e.g., without storing an entire copy of the parent snapshot). These changes, which may be known as "diffs," can include file level diffs (sometimes referred to herein as "file diff"). File storage, as known to those of skill in the art, organizes and represents data as a hierarchy of files. A "volume" can represent a file system volume with directories, files, etc., and can contain a list of snapshots. In some embodiments, file diff is aligned to byte boundaries. In some embodiments, a volume can be divided into "chunks" of variable size on byte boundaries (e.g., file boundaries). Stated differently, all the chunks do not have a same chunk size. As discussed further below, a chunk is the unit used for deduplication that allows multiple volumes to point to the same chunk(s) to save space. In some embodiments, while chunks may not have a same chunk size, an average size of chunks used in deduplication is approximately 80 kilobytes (KB). It is noted, however, that embodiments herein do not limit chunks to a particular size and/or average size.

In accordance with the present disclosure, data stored on an SDDC may be copied to a remote server. The data may be log data. A log, as referred to herein, is a data structure comprising a series of log segments (sometimes referred to herein simply as "segments") written out in order. Segments can be of a particular size. In some embodiments, each segment of a log is 4 megabytes (MB). The data can be managed by a log-structured file system (LFS). Metadata associated with the data can be stored in a cloud infrastructure (e.g., separate from the remote server) in accordance with the present disclosure. Metadata can be managed by a log-structured merging (LSM) tree.

The figures herein follow a numbering convention in which the first digit or digits correspond to the drawing figure number and the remaining digits identify an element or component in the drawing. Similar elements or components between different figures may be identified by the use of similar digits. For example, 114 may reference element "14" in FIG. 1, and a similar element may be referenced as 214 in FIG. 2. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

FIG. 1 illustrates data structures for supporting deduplication in file storage using file chunk hashes according to one or more embodiments of the present disclosure. As shown in FIG. 1, embodiments of the present disclosure can include three levels of on-disk data structures. A first (e.g., bottom) level 100 is the LFS, where the data resides. This data can be used to activate a secondary SDDC in the event of a disaster and can therefore be considered the "source of truth." Though only two log segments are shown in the example illustrated in FIG. 1, embodiments of the present disclosure are not so limited. A second (e.g., middle) level 102 is content addressable storage (CAS). The CAS comprises an LSM tree and includes an index for data deduplication. A third (e.g., top) level 104 is a logical layer, which comprises the volume, a list of snapshots, and a mapping between logical addresses and content in the CAS. The first level 100 comprises data, while the second level 102 and the third level 104 comprise metadata.

The CAS of the second level 102 sits between the logical layer of the top level 104 and the LFS of the bottom level 100. The CAS can allow deduplication based on content. The CAS can provide a level of indirection to allow the LFS of the bottom level 100 to move data during garbage collection, for instance.

As discussed further below, embodiments of the present disclosure can hash chunks of data. In some embodiments, a secure hash algorithm (SHA) (e.g., SHA-256) is used as a content hash, such that any chunks with identical hashes are considered to be duplicates. The CAS can determine a location of a chunk in the LFS based on a hash of that chunk.

Figure 2:
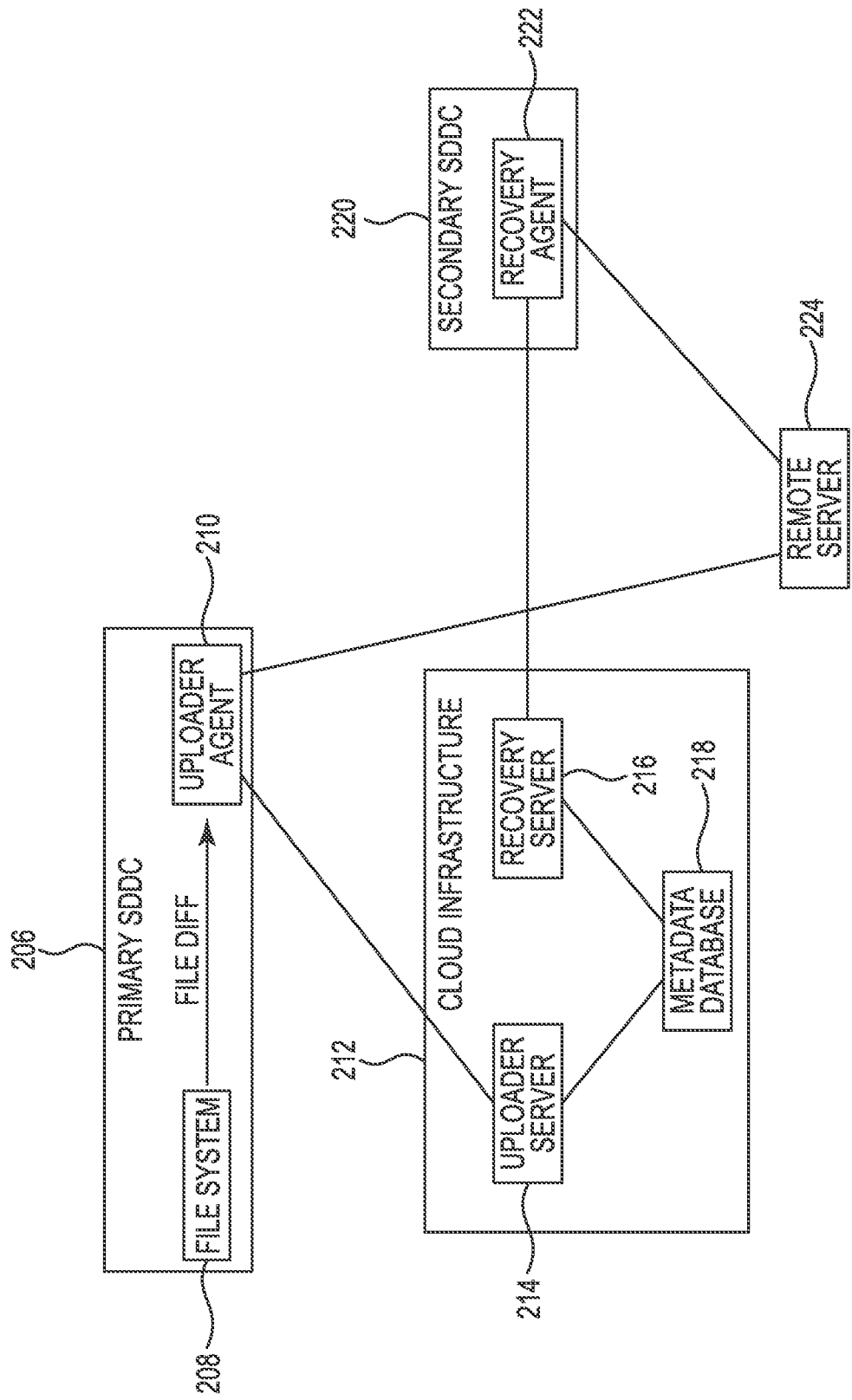
FIG. 2 illustrates an environment for supporting deduplication in file storage using file chunk hashes according to one or more embodiments of the present disclosure.

FIG. 2 illustrates an environment for supporting deduplication in file storage using file chunk hashes according to one or more embodiments of the present disclosure. As shown in FIG. 2, the environment can include a primary SDDC 206, a cloud infrastructure 212, a secondary SDDC, and a remote server 224. It is noted that while single instances of these components are shown in the example illustrated in FIG. 2, embodiments of the present disclosure are not limited to a particular quantity of the primary SDDC 206, the cloud infrastructure 212, the secondary SDDC, and/or the remote server 224. An example host and system, which may be found in the primary SDDC 206 and/or the secondary SDDC 220 but are not illustrated in FIG. 2, are described further below in connection with FIG. 5.

The primary SDDC 206 can include a file system 208 that communicates file diff (sometimes referred to herein simply as "data") to an uploader agent 210. The uploader agent 210 can hash and compress the data, and can communicate the data, the hash, and a key ID to a remote server 224. In some embodiments, the uploader agent 210 can hash the data using SHA-256 with a per-customer salt. Stated differently, the salt can be particular to a customer having an ownership interest in the data. As a result, the same data, if owned by different customers, will have different hashes because their respective salts are different.

The uploader agent 210 can communicate the hashes to an uploader server 214 of the cloud infrastructure 212. The uploader server 214 can execute logic representing the file diffs in the metadata database 218. The metadata database can provide storage managing data structures (e.g., low level data structures). In some embodiments, the uploader server 214 is stateless, and states are stored in the metadata database 218. This can allow the metadata database 218 to be directly operated by the recovery agent 222 of the secondary SDDC for disaster recovery. The recovery agent 222 can restore VCIs and file diffs following a disaster, for instance, or when otherwise desired. The recovery agent 222 can communicate with the metadata database 218 to determine which data to read and then communicate with the remote server 224 to read that data. The CAS, previously described in connection with FIG. 1 (e.g., the second level 102), can be provided by the cloud infrastructure 212, and the LFS (e.g., the first level 100) can be provided by the remote server 224.

As previously discussed, the CAS can locate a chunk in LFS given its content hash. A straightforward schema for such a relationship may be: hash→(refCount, LFSAddress). However, because hash values are randomly distributed they lack spatial locality. As a result, reading CAS generates random reads which may not be effectively cached in memory. For example, when reading 10 chunks in a contiguous logical space range of a snapshot, these 10 chunks will point to 10 random hash values, which may generate 10 cache misses during reading. However, if the hash values are contiguous, the first read miss can bring in the rest of the hash values to the cache and reduce the number of cache misses to 1. In order to provide contiguousness, embodiments of the present disclosure can separate the CAS into two maps: a hash map and a chunk map. The hash map, which may be expressed as: hash→chunkID, can store associations between chunk identifiers and hashes. The chunk map, which may be expressed as: chunkID→(refCount, LFSAddress), can store associations between the chunk identifiers and segments. RefCount, used for deduplication, is discussed further below in connection with FIG. 4.

Chunk identifiers can provide spatial locality because they are sequentially allocated and associated with hashes and segments in the order that they are uploaded. In accordance with embodiments herein, when the logical layer points to CAS, it points to the chunk identifier rather than the hash. This can reduce segment cleaning overhead because searching all chunk identifiers in a segment to determine which chunks are still live can be performed faster as most chunks in a same segment have contiguous (e.g., sequential) chunk identifiers. In addition, embodiments herein using chunk identifiers can merge adjacent tuples. For instance, a num field can be added to the chunk map to yield: chunkID→ (refCount, LFSAddress, num). When contiguous chunks point to the same segment and have the same reference count, they can be merged into a single tuple by setting num to the number of contiguous chunks. The reduction in tuple size and the increased ability for caching is illustrated in the example shown in FIG. 3.

Figure 3:
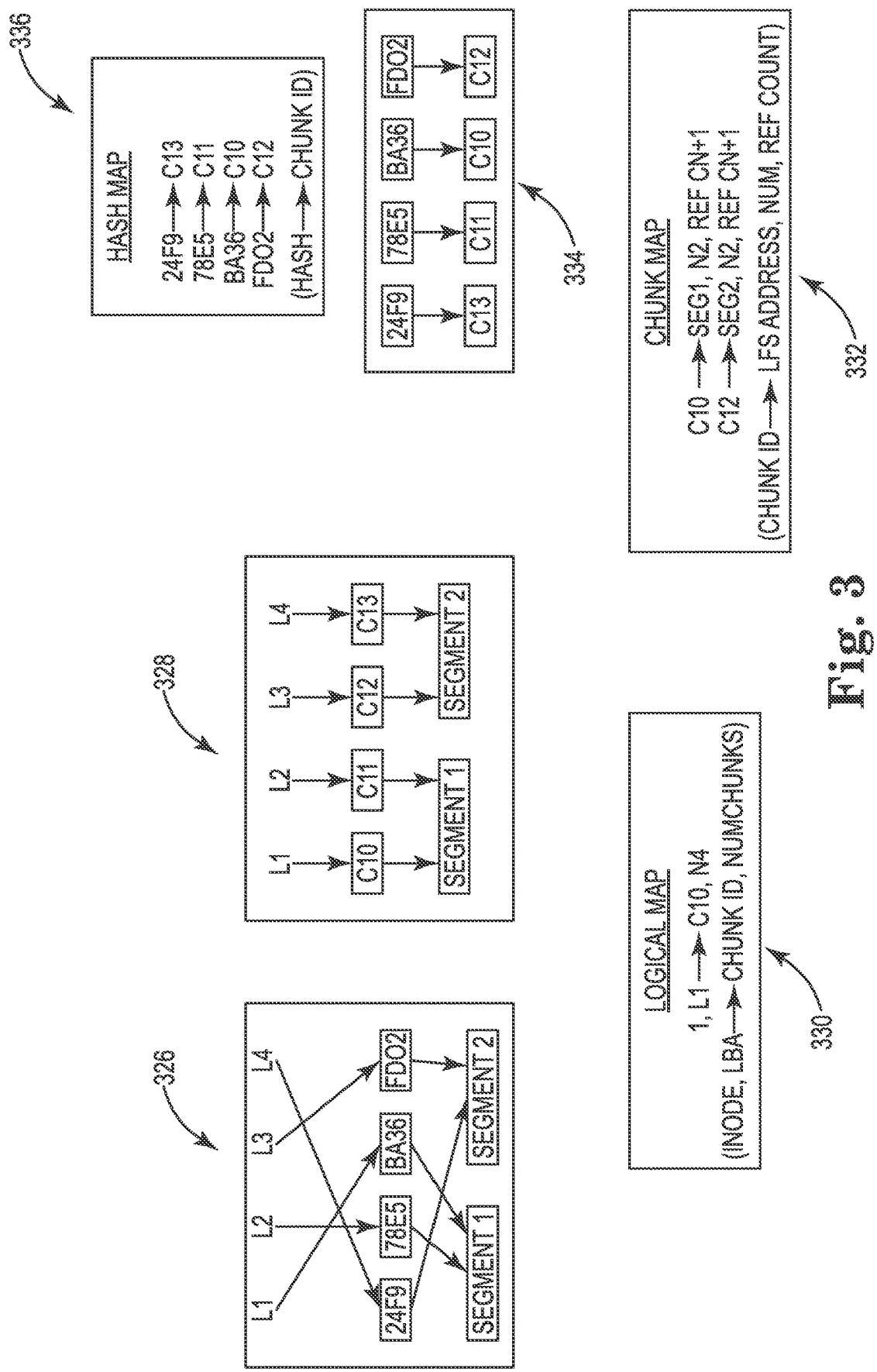
FIG. 3 illustrates example maps for supporting deduplication in file storage using file chunk hashes according to one or more embodiments of the present disclosure.

FIG. 3 illustrates example maps for supporting deduplication in file storage using file chunk hashes according to one or more embodiments of the present disclosure. As shown at 326, in the absence of chunk identifiers, logical addresses L1, L2, L3, and L4 correspond to hashes BA36, 78E5, FD02, and 24F9, respectively. Two of the hashes, 78E5 and BA36, point to segment 1. Two of the hashes, 24F9 and FD02, point to segment 2. In order to provide contiguousness, embodiments of the present disclosure can utilize sequentially-allocated chunk identifiers. As shown at 328, logical addresses L1, L2, L3, and L4 can be associated with chunk identifiers C10, C11, C12, and C13, respectively. C10 and C11 point to segment 1. C12 and C13 point to segment 2. As a result of the contiguousness of the chunk identifiers, the logical map can be shortened. As shown at 330, a single tuple can summarize the association of the example logical addresses with chunk identifiers. Similarly, the chunk map, shown at 332, has adjacent tuples merged. At 334 and 336 the hash map shows that hash 24F9 is associated with chunk identifier C13, hash 78E5 is associated with chunk identifier C11, hash BA36 is associated with chunk identifier C10, and hash FD02 is associated with chunk identifier C12.

Figure 4:
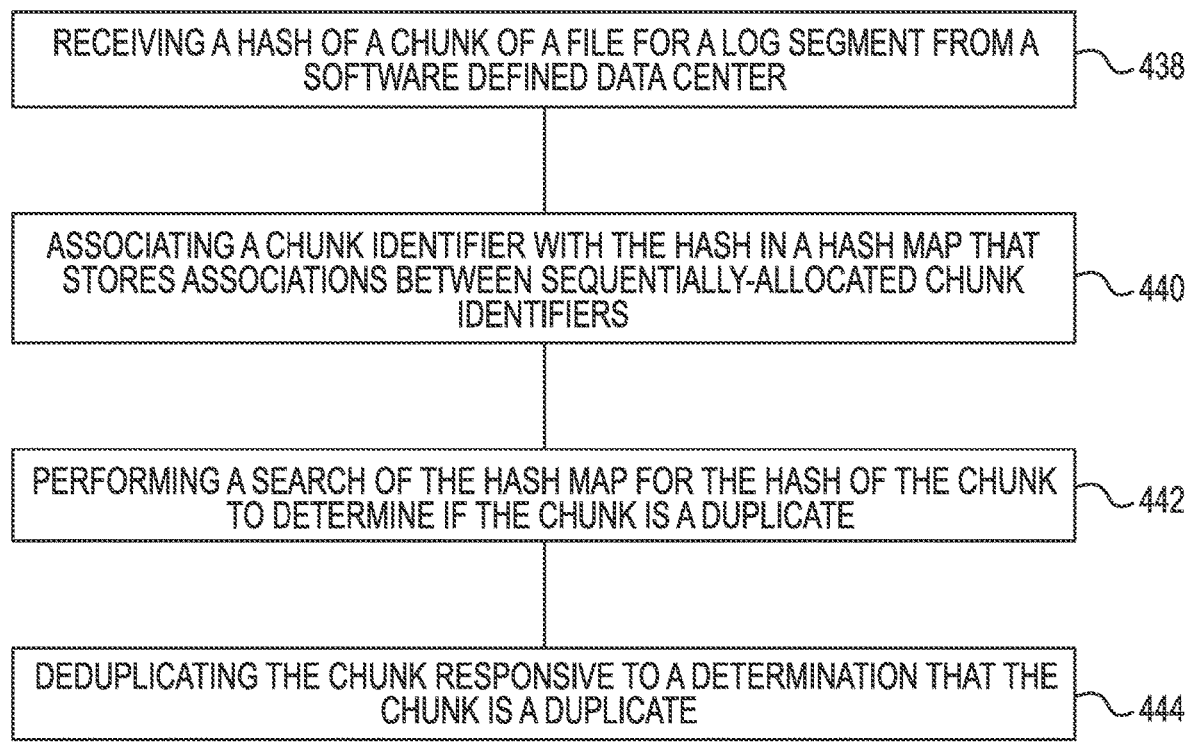
FIG. 4 illustrates a method for supporting deduplication in file storage using file chunk hashes according to one or more embodiments of the present disclosure.

FIG. 4 illustrates a method for supporting deduplication in file storage using file chunk hashes according to one or more embodiments of the present disclosure. The method can be performed by a cloud infrastructure, for instance (e.g., the uploader server 214 of the cloud infrastructure 212, previously described in connection with FIG. 2).

At 438, the method includes receiving a hash of a chunk of a file for (e.g., associated with) a log segment from a software defined data center. In some embodiments, each chunk can be hashed using SHA-256. A concatenation of the chunk and a customer-specific salt can be hashed. At 440, the method includes associating a chunk identifier with the hash in a hash map that stores associations between sequentially-allocated chunk identifiers and hashes. Chunk identifiers can be allocated sequentially and thus stored together in the LSM tree. When contiguous chunks point to the same LFS segment and have the same reference count, they can be merged into a single tuple.

In some embodiments, the method includes associating the chunk identifier with a logical address corresponding to the chunk of the log segment in a logical map that stores associations between the sequentially-allocated chunk identifiers and logical addresses. Embodiments herein can combine an approximate cache with a cache (e.g., a non-approximate cache). At 442, the method includes performing a search of the hash map for the hash of the chunk to determine if the chunk is a duplicate. In some embodiments, performing a search of the hash map can include applying an approximate member query (AMQ) filter to the hash map to determine whether the hash has a potential duplicate in the hash map. In some embodiments, the AMQ filter can be a quotient filter. In some embodiments, the AMQ filter can be a Bloom filter. For example, such a Bloom filter can be discarded and rebuilt periodically (e.g., monthly) in memory.

If it is determined that the chunk has the potential duplicate, a Cuckoo hash can be applied to the hash map to determine whether the chunk has a duplicate in the hash map. The application of the Cuckoo hash, and hash matching generally, can be carried out in accordance with U.S. Pat. No. 10,628,382, the entirety of which is incorporated herein by reference. If it is determined that the chunk has a duplicate in the hash map, a chunk identifier associated with the duplicate can be provided. The chunk identifier can be used for deduplication. An example of executable instructions (e.g., pseudocode) associated with performing the search is:

```
search the approximate cache # memory operation, very fast
if not found:
    return false # this is not a dup
# may be a dup
foundEntry = search the Cuckoo Hash for the hash value
if foundEntry:
    return foundEntry.chunkId
read the ChunkMap on disk to find out the chunk id
if not found: # false positive from the quotient filter
    return false
insert the chunk id read from disk into the Cuckoo Hash
return the found chunk id
```

At 444, the method includes deduplicating the chunk responsive to a determination that the chunk is a duplicate. In some embodiments, deduplicating includes not writing data associated with the chunk (e.g., discarding the data). In some embodiments, deduplicating includes increasing a reference count of the chunk identifier associated with the duplicate of the hash in a chunk map that stores associations between chunk identifiers and segments. As a result, the same chunk can be pointed to multiple times by increasing refCount.

An example of executable instructions (e.g., pseudocode) associated with deduplicating is:

```
for each hash value:
    foundEntry = search HashMap
    if found:
        # this is a dup, do not write data, but increase refcount
        ChunkMap[foundEntry.chunkId].refCount += 1
        ChunkId = foundENtry.chunkId
    Else:
        # not a dup
        Insert hash value into the hash map
        chunkId = allocate a new chunk id
    insert LBA → chunkId into the Logical map
```

Figure 5:
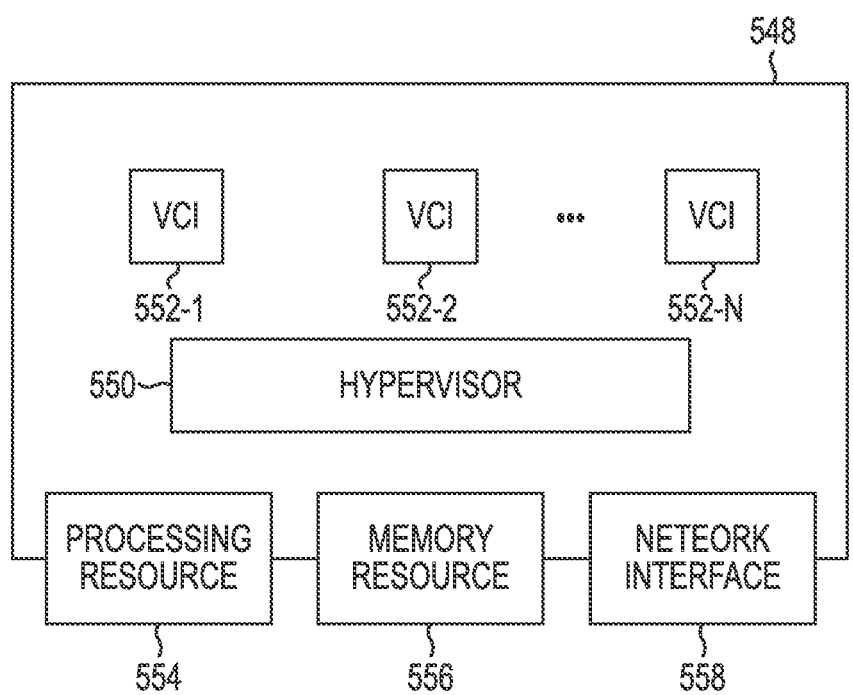
FIG. 5 is a diagram of a host and a system for supporting deduplication in file storage using file chunk hashes according to one or more embodiments of the present disclosure.

FIG. 5 is a diagram of a host and a system for supporting deduplication in file storage using file chunk hashes according to one or more embodiments of the present disclosure. The system can include a host 548 with processing resources 554 (e.g., a number of processors), memory resources 556, and/or a network interface 558. The host 548 can be included in a software defined data center. A software defined data center can extend virtualization concepts such as abstraction, pooling, and automation to data center resources and services to provide information technology as a service (ITaaS). In a software defined data center, infrastructure, such as networking, processing, and security, can be virtualized and delivered as a service. A software defined data center can include software defined networking and/or software defined storage. In some embodiments, components of a software defined data center can be provisioned, operated, and/or managed through an application programming interface (API).

The host 548 can incorporate a hypervisor 550 that can execute a number of virtual computing instances 552-1, 552-2, . . . , 552-N (referred to generally herein as "VCIs 552"). The VCIs 552 can be provisioned with processing resources 554 and/or memory resources 556 and can communicate via the network interface 558. The processing resources 554 and the memory resources 556 provisioned to the VCIs 552 can be local and/or remote to the host 548. For example, in a software defined data center, the VCIs 552 can be provisioned with resources that are generally available to the software defined data center and not tied to any particular hardware device. By way of example, the memory resources 556 can include volatile and/or non-volatile memory available to the VCIs 552. The VCIs 552 can be moved to different hosts (not specifically illustrated), such that a different hypervisor manages the VCIs 552.

The present disclosure is not limited to particular devices or methods, which may vary. The terminology used herein is for the purpose of describing particular embodiments, and is not intended to be limiting. As used herein, the singular forms "a", "an", and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to."

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
   receiving a hash of a chunk of a file for a log segment from a software defined data center;
   associating a chunk identifier with the hash in a hash map that stores associations between sequentially-allocated chunk identifiers and hashes;
   associating the chunk identifier with a logical address corresponding to the chunk of the file for the log segment in a logical map that stores associations between the sequentially-allocated chunk identifiers and logical addresses, wherein contiguous chunks that point to a same log segment and have a same reference count are merged into a single tuple;
   performing a search of the hash map for the hash of the chunk to determine if the chunk is a duplicate; and
   deduplicating the chunk responsive to a determination that the chunk is a duplicate.

2. The method of claim 1, wherein the method includes the software defined data center hashing the chunk using a salt particular to a customer having an ownership interest in the chunk of the log segment.

3. The method of claim 1, wherein the method includes associating the chunk identifier with the logical address corresponding to the chunk of the file for the log segment in the logical map that stores associations between the sequentially-allocated chunk identifiers and logical addresses in an order in which hashes of chunks corresponding to the logical addresses are received.

4. The method of claim 1, wherein the method includes receiving a plurality of hashes of a plurality of chunks of a plurality of log segments from the software defined data center, wherein the sequentially-allocated chunk identifiers each correspond to a respective one of a plurality of chunks of the plurality of log segments in a chunk map.

5. The method of claim 4, wherein the method includes separating the plurality of log segments into the plurality of chunks along byte boundaries, and wherein the plurality of chunks do not all have a same chunk size.

6. The method of claim 1, wherein performing the search of the hash map to determine if the chunk is a duplicate includes:
   applying an approximate member query filter to the hash map to determine whether the hash has a potential duplicate in the hash map;
   responsive to determining that the chunk has the potential duplicate, applying a Cuckoo hash to the hash map to determine whether the chunk has a duplicate in the hash map; and
   responsive to determining that the chunk has a duplicate in the hash map, providing a chunk identifier associated with the duplicate.

7. The method of claim 6, wherein deduplicating the chunk includes:
   not writing data associated with the chunk;
   increasing a reference count of the chunk identifier associated with the duplicate of the hash in a chunk map that stores associations between chunk identifiers and log segments.

8. A non-transitory machine-readable medium having instructions stored thereon which, when executed by a processor, cause the processor to:
   receive a hash of a chunk of a file for a log segment from a software defined data center;
   associate a chunk identifier with the hash in a hash map that stores associations between sequentially-allocated chunk identifiers and hashes;
   associate the chunk identifier with a logical address corresponding to the chunk of the file for the log segment in a logical map that stores associations between the sequentially-allocated chunk identifiers and logical addresses, wherein contiguous chunks that point to a same log segment and have a same reference count are merged into a single tuple;
   perform a search of the hash map for the hash of the chunk to determine if the chunk is a duplicate; and
   deduplicate the chunk responsive to a determination that the chunk is a duplicate.

9. The medium of claim 8, including instructions to hash the chunk using a salt particular to a customer having an ownership interest in the chunk of the log segment.

10. The medium of claim 8, including instructions to associate the chunk identifier with the logical address corresponding to the chunk of the file for the log segment in the logical map that stores associations between the sequentially-allocated chunk identifiers and logical addresses in an order in which hashes of chunks corresponding to the logical addresses are received.

11. The medium of claim 8, including instructions to receive a plurality of hashes of a plurality of chunks of a plurality of log segments from the software defined data center, wherein the sequentially-allocated chunk identifiers each correspond to a respective one of a plurality of chunks of the plurality of log segments in a chunk map.

12. The medium of claim 11, including instructions to separate the plurality of log segments into the plurality of chunks along byte boundaries, and wherein the plurality of chunks do not all have a same chunk size.

13. The medium of claim 8, wherein the instructions to perform the search of the hash map to determine if the chunk is a duplicate include instructions to:
    apply an approximate member query filter to the hash map to determine whether the hash has a potential duplicate in the hash map;
    responsive to a determination that the chunk has the potential duplicate, apply a Cuckoo hash to the hash map to determine whether the chunk has a duplicate in the hash map; and
    responsive to a determination that the chunk has a duplicate in the hash map, provide a chunk identifier associated with the duplicate.

14. The medium of claim 13, wherein the instructions to deduplicate the chunk include instructions to:
    not write data associated with the chunk;
    increase a reference count of the chunk identifier associated with the duplicate of the hash in a chunk map that stores associations between chunk identifiers and log segments.

15. A system, comprising:
    a processor; and
    a memory having instructions stored thereon, which, when executed by the processor, cause the processor to:
      receive a hash of a chunk of a file for a log segment from a software defined data center;
      associate a chunk identifier with the hash in a hash map that stores associations between sequentially-allocated chunk identifiers and hashes;
      associate the chunk identifier with a logical address corresponding to the chunk of the file for the log segment in a logical map that stores associations between the sequentially-allocated chunk identifiers and logical addresses, wherein contiguous chunks that point to a same log segment and have a same reference count are merged into a single tuple;
      perform a search of the hash map for the hash of the chunk to determine if the chunk is a duplicate; and
      deduplicate the chunk responsive to a determination that the chunk is a duplicate.

16. The system of claim 15, including instructions to hash the chunk using a salt particular to a customer having an ownership interest in the chunk of the log segment.

17. The system of claim 15, including instructions to associate the chunk identifier with the logical address corresponding to the chunk of the file for the log segment in the logical map that stores associations between the sequentially-allocated chunk identifiers and logical addresses in an order in which hashes of chunks corresponding to the logical addresses are received.

18. The system of claim 15, including instructions to receive a plurality of hashes of a plurality of chunks of a plurality of log segments from the software defined data center, wherein the sequentially-allocated chunk identifiers each correspond to a respective one of a plurality of chunks of the plurality of log segments in a chunk map.

19. The system of claim 15, wherein the instructions to perform the search of the hash map to determine if the chunk is a duplicate include instructions to:
    apply an approximate member query filter to the hash map to determine whether the hash has a potential duplicate in the hash map;
    responsive to a determination that the chunk has the potential duplicate, apply a Cuckoo hash to the hash map to determine whether the chunk has a duplicate in the hash map; and
    responsive to a determination that the chunk has a duplicate in the hash map, provide a chunk identifier associated with the duplicate.

20. The system of claim 19, wherein the instructions to deduplicate the chunk include instructions to:
    not write data associated with the chunk;
    increase a reference count of the chunk identifier associated with the duplicate of the hash in a chunk map that stores associations between chunk identifiers and log segments.

* * * * *